US 8,265,426 B2

(12) United States Patent
Terada et al.

(10) Patent No.: US 8,265,426 B2
(45) Date of Patent: Sep. 11, 2012

(54) IMAGE PROCESSOR AND IMAGE PROCESSING METHOD FOR INCREASING VIDEO RESOLUTION

(75) Inventors: Munehiro Terada, Fukaya (JP); Kenichi Nagai, Isesaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/034,301

(22) Filed: Feb. 24, 2011

(65) Prior Publication Data

US 2011/0267539 A1 Nov. 3, 2011

Related U.S. Application Data

(63) Continuation of application No. 12/475,229, filed on May 29, 2009, now abandoned.

(30) Foreign Application Priority Data

Aug. 4, 2008 (JP) ................................ 2008-201201

(51) Int. Cl.
*G06K 9/32* (2006.01)
*G09G 5/00* (2006.01)
*G09G 5/10* (2006.01)
*H04N 5/44* (2011.01)
*H04N 9/74* (2006.01)
*H04N 3/223* (2006.01)
*H04N 1/393* (2006.01)

(52) U.S. Cl. ........ 382/298; 382/299; 345/660; 345/698; 348/561; 348/581; 348/582; 348/704; 358/451

(58) Field of Classification Search .................. None
See application file for complete search history.

(56) References Cited

U.S. PATENT DOCUMENTS

| 5,774,601 | A | 6/1998 | Mahmoodi |
| 6,717,622 | B2 | 4/2004 | Lan |
| 6,801,339 | B1 | 10/2004 | Ito |
| 7,405,740 | B1 | 7/2008 | Neugebauer |
| 2001/0028745 | A1* | 10/2001 | Nakaya .......................... 382/236 |
| 2002/0126910 | A1 | 9/2002 | Gindele et al. |
| 2004/0081367 | A1 | 4/2004 | Nonaka |
| 2005/0008336 | A1* | 1/2005 | Ishida ............................. 386/95 |

(Continued)

FOREIGN PATENT DOCUMENTS

JP 2913669 1/1991

(Continued)

OTHER PUBLICATIONS

European Patent Application No. 09007864.3 Search Report dated Nov. 10, 2009.

(Continued)

*Primary Examiner* — Randolph I Chu
(74) *Attorney, Agent, or Firm* — Blakely, Sokoloff, Taylor & Zafman LLP (57) ABSTRACT

According to one embodiment, an image processor comprises an image converter and a controller. The image converter is configured to convert a first video signal of a first resolution to a second video signal of a second resolution higher than the first resolution. The conversion is based on a parameter indicating a ratio of high-frequency component pixels of the first video signal to be interpolated and pixels forming the first video signal to be interpolated. The controller is configured to change the parameter based on a type of broadcast wave of the first video signal. The type of broadcast wave may include, but is not limited or restricted to satellite broadcasting or terrestrial broadcasting.

23 Claims, 7 Drawing Sheets

| SOURCE CODE | TYPE OF SOURCE | | SUPER-RESOLUTION PARAMETER |
|---|---|---|---|
| 1 | BROADCASTING | CS | 10 |
| 2 | | BS | 80 |
| 3 | | TERRESTRIAL DIGITAL | 30 |
| 4 | | TERRESTRIAL ANALOG | 50 |
| 5 | EXTERNAL SOURCE | HDMI | 70 |
| ⋮ | ⋮ | ⋮ | ⋮ |

U.S. PATENT DOCUMENTS

| | | |
|---|---|---|
| 2005/0157949 A1 | 7/2005 | Aiso et al. |
| 2005/0212964 A1* | 9/2005 | Higashi et al. ............... 348/555 |
| 2005/0253967 A1* | 11/2005 | Yoshida ..................... 348/556 |
| 2006/0045384 A1 | 3/2006 | De Haan |
| 2006/0056735 A1 | 3/2006 | De Haan |
| 2006/0087585 A1* | 4/2006 | Seo et al. ................... 348/385.1 |
| 2006/0132649 A1* | 6/2006 | Miyazawa ................... 348/458 |
| 2006/0133696 A1 | 6/2006 | Kondo |
| 2006/0165307 A1 | 7/2006 | Kondo et al. |
| 2007/0047832 A1 | 3/2007 | Nonaka et al. |
| 2007/0116383 A1 | 5/2007 | De Haan |
| 2007/0268400 A1* | 11/2007 | Kondo et al. ............... 348/441 |
| 2010/0302348 A1* | 12/2010 | Richards ..................... 348/36 |

FOREIGN PATENT DOCUMENTS

| | | |
|---|---|---|
| JP | 2002288651 | 10/2002 |
| JP | 2004140624 | 5/2004 |
| JP | 2005136679 | 5/2005 |
| JP | 2008067110 | 5/2005 |
| JP | 2006060335 | 3/2006 |
| JP | 2006221221 | 8/2006 |
| JP | 2006236317 | 9/2006 |
| JP | 2007060457 | 3/2007 |
| JP | 2007163562 | 6/2007 |
| JP | 2007193508 | 8/2007 |
| JP | 2008146190 | 6/2008 |
| WO | 9016034 | 12/1990 |
| WO | 9016035 | 12/1990 |
| WO | 0159706 | 8/2001 |
| WO | 2005041170 | 5/2005 |

OTHER PUBLICATIONS

Japanese Patent Application No. 2008-201201, Notice of Rejection, mailed Sep. 29, 2009, (with English Translation).

European Patent Application No. 11157292.1 Search Report dated May 16, 2011.

U.S. Appl. No. 12/475,229, Non-Final Office Action, mailed Apr. 29, 2010.

U.S. Appl. No. 12/475,229, Final Office Action, mailed Aug. 16, 2010.

U.S. Appl. No. 12/475,229, Non-Final Office Action, mailed Nov. 26, 2010.

* cited by examiner

| | | 1/16 (TUE) | 1/16 (TUE) 17 (WED) 18 (THU) 19 (SAT) 20 (SAT)<br>21 (SUN) 22 (MON) 23 (TUE) | | | | 1/16 (TUE) PM 6:10 | |
|---|---|---|---|---|---|---|---|---|
| | 012 | 2 | 023 | 4 | 041 | 6 | 061 | 8 | 081 | 5 | 051 | 7 | 071 |
| | A BROADCASTING | B BROADCASTING | C BROADCASTING | D BROADCASTING | E BROADCASTING | F BROADCASTING | G BROADCASTING |
| PM 6 | MOVIE UNFORGETTABLE SUMMER | 30 MOVIE BLUE OCEAN | 00 MOVIE NOW 10<br>RANKING OF 50 JULY... | 00 SHOPPING SPECIAL: CLEANING INSPIRATION (BEAUTY AND HEALTH PRODUCTS ARE INTRODUCED) | 00 HI-VISION SPECIAL "SMALL TRIP" VOL. 5 IN SENDAI | 00 WORLD SERIES SOCCER | 00 6 O'CLOCK NEWS |
| PM 7 | 10 MY TEACHER | | 10 MOVIE JAPANESE MASTERPIECE SPECIAL 01 "XX DIARY" | 20 JAPANESE SCENERY 11 AUTUMN IN KYOTO... | 10 MAJOR LEAGUE LIVE XX VS YY AT ZZ STADIUM | 30 WORLD SERIES SOCCER 2 | 00 TRIP TO JAPAN IN WINTER STAY IN FAMOUS RYOKAN KANAZAWA AND FUKUI |
| PM 8 | 00 BOY FROM AMERICA | | 00 WORLD OF CLASSIC | 00 NEWS 20 FASHION | 30 JAPANESE CHESS SEASON 11 MATCH BETWEEN XXX AND YYY | 00 NEWS 20 WEATHER | |
| PM 9 | 30 MOVIE DOG AND CAT STORY | 50 MOVIE OF THE MONTH | 10 MOVIE WORLD TRAVELLING | 10 GARDENING... | 00 CARTOON FAIR SHOWA 40 | 00 FUN LIFE 45 NEWS 22 | 00 MOVIE REVOLUTION |
| PM 10 | 50 ✓ MOVIE OF THE MONTH | 00 THEATRE: EVENING EVENT | | | | | |
| PM 11 | 10 MOVIE PRAIRIE IN HOKKAIDO | | 00 WORLD HERITAGE | 10 DRAMA: KOREAN DRAMA | 00 TODAY'S NEWS | 30 SUMO | 00 NEWS & SPORTS |

| NOW ON BROADCASTING | SHOPPING | | | | PM 6:00~PM 8:00 | |
|---|---|---|---|---|---|---|
| SPECIAL: CLEANING INSPIRATION (BEAUTY AND HEALTH PRODUCTS ARE INTRODUCED) | | | | | SD:525I | |
| ≪ ≫ CHANGE PAGE | ≪ ≫ | B TO CURRENT TIME | R CHANGE DATE AND TIME | PROGRAM GUIDE | G MINI PROGRAM GUIDE | Y SEARCH PROGRAM | QUICK |

| NOISE AMOUNT | SUPER-RESOLUTION PARAMETER |
|---|---|
| 0 TO 10 | 80 |
| 11 TO 30 | 70 |
| 31 TO 50 | 50 |
| 51 TO 70 | 30 |
| 71 TO | 10 |
| ⋮ | ⋮ |

IMAGE PROCESSOR AND IMAGE PROCESSING METHOD FOR INCREASING VIDEO RESOLUTION

CROSS-REFERENCE TO RELATED APPLICATIONS

This application is a continuation of U.S. patent application Ser. No. 12/475,229 filed May 29, 2009 and is based upon and claims the benefit of priority from Japanese Patent Application No. 2008-201201, filed Aug. 4, 2008, the entire contents of which are incorporated herein by reference.

BACKGROUND

1. Field

One embodiment of the invention relates to a technology for increasing resolution of an image, and relates particularly to an image processor and an image processing method for increasing resolution of an image.

2. Description of the Related Art

Recent progress in the integration of a personal computer (PC) and a television provides more opportunities to view various types of videos on a high-resolution display with high definition (HD) exceeding standard definition (SD).

Video broadcast for SD televisions, video recorded on DVD, or the like has low resolution. Therefore, when users view video in HD size (especially, in full HD size, i.e., full HD resolution of 1920×1080 pixels), the resolution of the video is increased. To increase the resolution of an image, technologies, such as linear interpolation and cubic convolution interpolation, have been used to calculate pixel values of the image. With such technologies, however, a sharp image cannot be obtained.

In view of this, a super resolution technology has been studied, in which an image is expanded, and high-frequency component pixels are interpolated between pixels of the expanded image to obtain a sharp high-resolution image (see, for example, Japanese Patent Application Publication (KO-KAI) Nos. 2008-067110 and 2008-146190). The conventional super resolution technology enhances the sharpness of video, and thus users can enjoy the sharp and clear video.

Videos are provided in various manners as, for example, via broadcasting including broadcasting satellite (BS) broadcasting, communication satellite (CS) broadcasting, digital terrestrial broadcasting, analog terrestrial broadcasting, and via the Internet. Accordingly, information amounts, noise amounts, and/or the like, of videos provided as such may differ for different types of videos. Therefore, when the super-resolution processing is equivalently performed on various videos, noise contained in, for example, the video provided via CS broadcasting having less information amount with respect to others becomes noticeable, thereby degrading the enhanced sharpness of video.

A method for sharpening video includes a sharpening process for sharpening appearance of video by sharpening an edge of the video, in accordance with various types of videos. However, such sharpening process entirely differs from the super resolution technology in that the super resolution technology on the other hand newly generates high-frequency component pixels. Thus, the sharpening technique used in the sharpening process cannot be used in the super resolution technology to adjust the sharpness of video in accordance with different types of videos.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 7 is an exemplary diagram of a program selection screen of when the super-resolution processing is performed based on program information in the first embodiment;

DETAILED DESCRIPTION

Various embodiments according to the invention will be described hereinafter with reference to the accompanying drawings. In general, according to one embodiment of the invention, an image processor has a resolution increase module, a detector, and a controller. The resolution increase module is configured to perform super-resolution processing by increasing, upon receipt of a first video signal having a first resolution, pixels by estimating an original pixel value from the first video signal, so as to restore the first video signal to a second video signal having a second resolution higher than the first resolution. The detector is configured to detect at least one of an information amount of the first video signal, a noise amount of the first video signal, and a type of a terminal to which the first video signal is input. The controller is configured to change a degree of the super-resolution processing performed by the resolution increase module based on a detection result of the detector.

According to another embodiment of the invention, an image processor has a level storage module, a determination module, and a resolution increase module. The level storage module configured to store a super-resolution level in association with an information amount of a first video signal having a first resolution, the super-resolution level indicating an intensity of a super-resolution conversion, the super-resolution conversion increasing, upon receipt of the first video signal, pixels by estimating an original pixel value from the first video signal so as to restore the first video signal to a second video signal having a second resolution higher than the first resolution. The determination module configured to determine the information amount of the first video signal, and decide the super-resolution level based on the information amount. The resolution increase module configured to perform the super-resolution conversion on the first image signal at the determined super-resolution level.

According to still another embodiment of the invention, an image processor has a resolution increase module, a detector, and a controller. The resolution increase module configured to perform super-resolution processing by increasing a first resolution of a first video signal to a second resolution of a second video signal. The detector configured to detect at least one of an information amount of the first video signal, a noise amount of the first video signal, and a type of a terminal to which the first video signal is input. The controller configured to change a degree of the super-resolution processing in the resolution increase module based on a detection result of the detector.

According to still another embodiment of the invention, an image processing method receiving a first video signal having a first resolution; performing super-resolution processing by increasing pixels by estimating an original pixel value from the first video signal so as to restore the first video signal to a second video signal having a second resolution higher than the first resolution; detecting at least one of an information amount of the first video signal, a noise amount of the first video signal, and a type of a terminal to which the first video signal is input; and controlling to change a degree of the super-resolution processing based on a detection result of the detecting.

Figure 1:
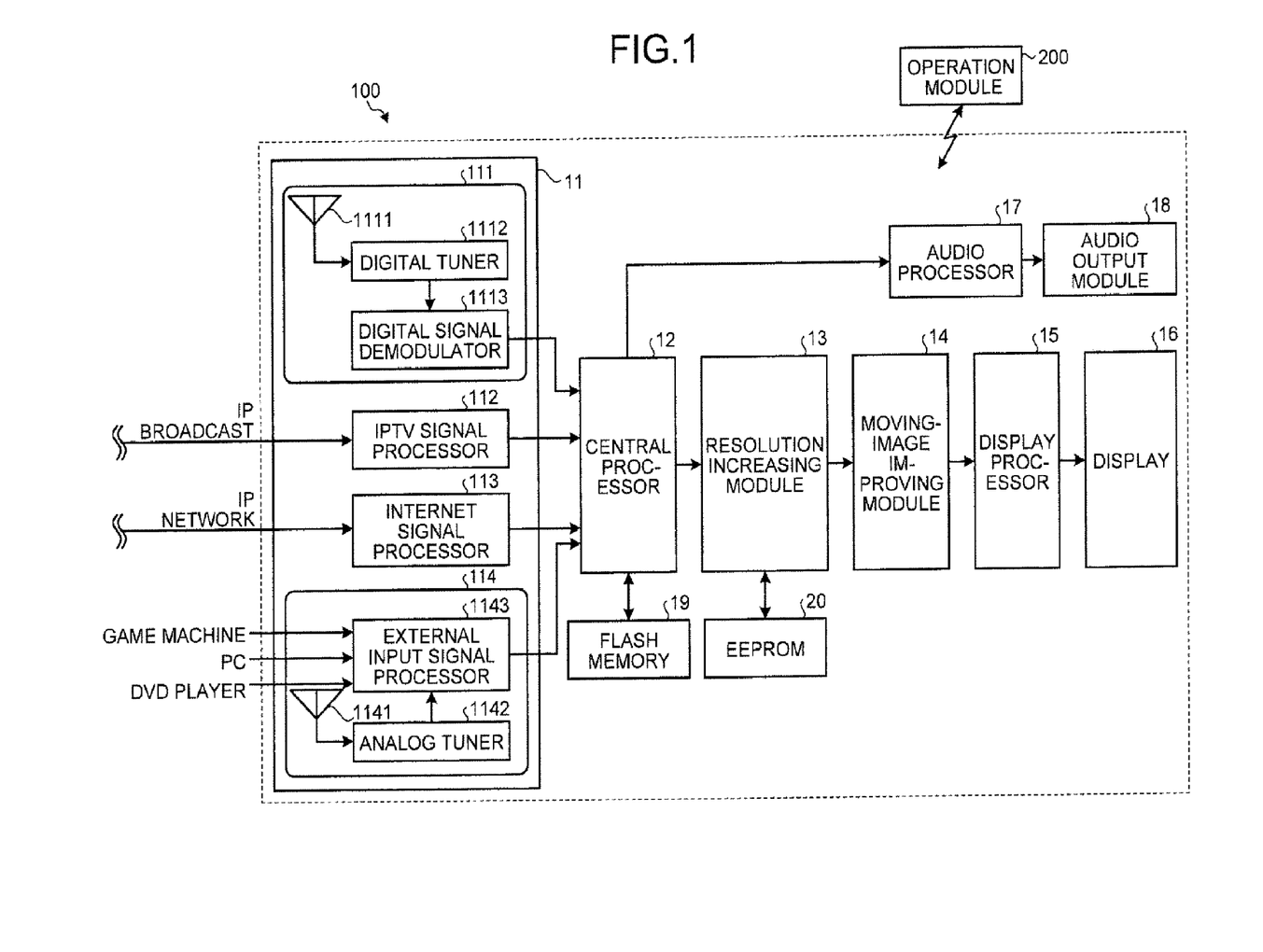
FIG. 1 is an exemplary schematic block diagram of an image display apparatus according to a first embodiment of the invention.

FIG. 1 is a schematic block diagram of an image display apparatus 100 according to an embodiment of the invention. As illustrated in FIG. 1, the image display apparatus 100 has a video signal input module 11, a central processor 12, a resolution increasing module 13, a moving-image improving module 14, a display processor 15, a display 16, an audio processor 17, and an audio output module 18. The resolution increasing module 13 corresponds to an image processing device.

The video signal input module 11 has a digital broadcast receiver 111, an Internet protocol television (IPTV) signal processor 112, an Internet signal processor 113, and an external input module 114. The digital broadcast receiver 111 receives a video signal to be displayed. The Internet signal processor 113 receives data transmitted through an IP network such as the Internet. The external input module 114 receives input of an analog signal. The term "video signal" as used herein includes an audio signal as well as an image signal such as a still image signal and a moving image signal.

The video signal includes a source code (the source code corresponds, for example, to "1" for BS broadcasting, "2" for CS broadcasting, "3" for digital terrestrial broadcasting, "4" for analog terrestrial broadcasting, "H" for High-Definition Multimedia Interface (HDMI), or the like) indicating a video type. The video type corresponds for example to a type of broadcasting, a bit rate of the video signals, information on interface standard such as HDMI, or the like. The type of broadcasting corresponds, for example, to BS broadcasting, CS broadcasting, terrestrial digital broadcasting, analog terrestrial broadcasting, etc. Further, the information on interface standards corresponds, for example, to that of an externally connected game machine, a digital versatile disk (DVD) player, and the like. In the following, the source codes are described as each of the aforementioned values for simplicity. Further, in the following explanation, the type of broadcasting is considered as the video type.

The digital broadcast receiver 111 has a digital antenna 1111, a digital tuner 1112, and a digital signal demodulator 1113. The digital antenna 1111 receives digital broadcasting such as BS broadcasting, CS broadcasting, and digital terrestrial broadcasting. The digital tuner 1112 is used to select a digital broadcast channel. The digital signal demodulator 1113 demodulates a digital broadcast signal, and outputs it to the central processor 12 as a digital video signal.

The IPTV signal processor 112 receives IP broadcasting transmitted over a dedicated IP network, and outputs it to the central processor 12 as a digital video signal.

The Internet signal processor 113 receives data (still image, moving image, etc.) transmitted over an IP network such as the Internet, and outputs it to the central processor 12 as a digital video signal.

The external input module 114 has an analog antenna 1141, an analog tuner 1142, and an external input signal processor 1143. The analog antenna 1141 receives analog broadcasting. The analog tuner 1142 is used to select an analog broadcast channel. The external input signal processor 1143 performs signal processing such as A/D conversion on an analog signal, and outputs it to the central processor 12 as a digital video signal. The external input signal processor 1143 is provided with a terminal (not shown) for connection to an external device such as a game machine, a personal computer (PC), and a (DVD) player. The external input signal processor 1143 performs the signal processing also on an analog signal received from an external device through the terminal.

Figure 2:
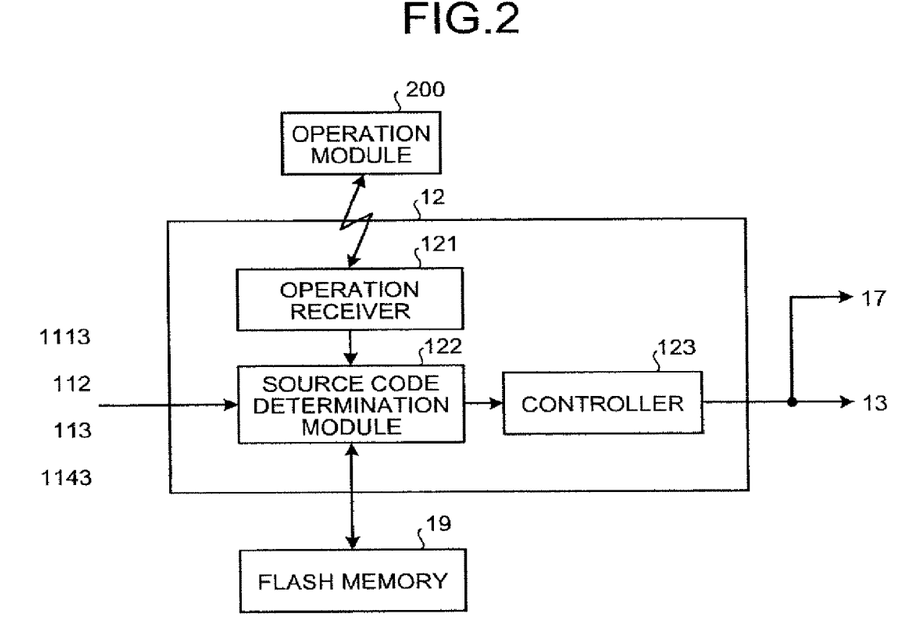
FIG. 2 is an exemplary schematic block diagram of a central processor shown in FIG. 1 in the first embodiment.

FIG. 2 is a functional block diagram of the central processor 12. As illustrated in FIG. 2, the central processor 12 has an operation receiver 121, a source code determination module 122, a controller 123, and a flash memory 19.

The operation receiver 121 receives, as will be described later, a signal indicating a type of broadcasting and the like instructed by a remote controller that is included in an operation module 200 (hereinafter, "selection signal"), and outputs a source code corresponding to the received selection signal to the source code determination module 122 described later.

Figure 3:
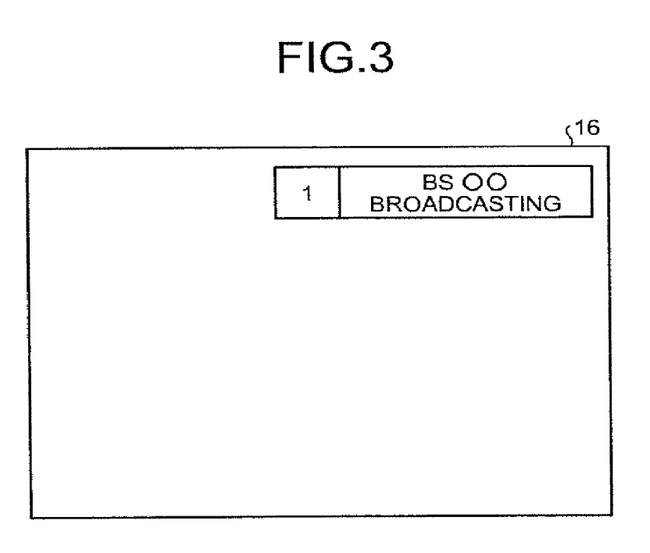
FIG. 3 is an exemplary diagram of a broadcasting displayed on a display by operation of an operation module in the first embodiment.

In particular, a user press a channel button or the like (not shown) of the operation module 200 that switches the broadcasting so as to select a type of broadcasting, a channel, a playback screen of an externally connected device (for example, DVD player or a game machine), and the like (FIG. 3 illustrates an example of when channel 1 of BS digital broadcasting is selected). Here, the operation receiver 121 receives the selection signal, and outputs it to the source code determination module 122.

The various source codes described hereinbefore corresponds to super resolution parameters described hereinafter indicating levels of super-resolution processing performed on the image signal separated from the video signal at the controller 123. The super-resolution processing corresponding to a source code is performed when a user specifies the source code or when the source code determination module 122 automatically identifies the source code contained in the video signal.

Referring back to FIG. 2, having received the video signal from the digital signal demodulator 1113, the IPTV signal processor 112, the Internet signal processor 113, or the external input module 114, the source code determination module 122 determines the source code contained in the video signal, and outputs the determined source code to the controller 123 with the video signal received from the video signal input module 11.

The source code determination module 122 further determines whether the source code instructed by the operation module 200 is received by the operation receiver 121. When it is determined that the source code instructed by the operation module 200 is received, the source code determination module 122 outputs a type of the specified source code to the controller 123 as well as writes it to the flash memory 19.

After the source code determination module 122 determines the source code, the controller 123 separates the video signal into an image signal and an audio signal. The controller 123 outputs the image signal subjected to a predetermined image processing to the resolution increasing module 13 as well as outputting the audio signal to the audio processor 17. Further, the controller 123 transmits, together with the image signal, an identification signal indicating a type of the source code received from the source code determination module 122 to the resolution increasing module 13.

Examples of the image processing the controller 123 performs on the image signal include scaling to convert the resolution of the image signal to a predetermined value (e.g., 1280×720).

As described above, the flash memory 19 stores the type of source code received by the operation receiver 121 from the operation module 200.

Figure 4:
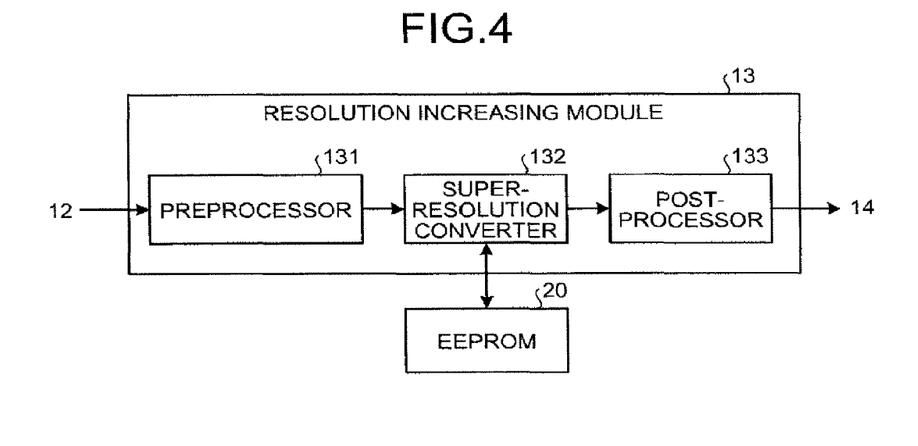
FIG. 4 is an exemplary schematic block diagram of a resolution increasing module shown in FIG. 1 in the first embodiment.

The resolution increasing module 13 is described below. FIG. 4 is a functional block diagram of the resolution increasing module 13. As illustrated in FIG. 4, the resolution increasing module 13 has a preprocessor 131, a super-resolution converter 132, a post-processor 133, and an electrically erasable programmable read-only memory (EEPROM) 20.

The preprocessor 131 performs an image process (hereinafter, "preprocessing") on the image signal received from the central processor 12, and then outputs it to the super-resolution converter 132, which will be described later. Examples of the preprocessing include interlace/progressive conversion and noise reduction to remove noise. The preprocessor 131 also outputs the type of the source code received from the central processor 12 to the super-resolution converter 132 described later. Incidentally, the identification signal corresponding to the aforementioned source code may be input to the super-resolution processor 132 from the central processor 12 without passing through the preprocessor 131.

More specifically, as the interlace/progressive conversion, the preprocessor 131 detects motion of an image from the image signal and determines whether the image is a still image or a moving image. When the image is a still image, the preprocessor 131 performs still-image interpolation. On the other hand, when the image is a moving image, the preprocessor 131 performs moving-image interpolation.

As the noise reduction, for example, the preprocessor 131 corrects the contour of the image, reduces image blur and glare, suppresses excessive equalizing (high-frequency enhancement), and corrects camera shake blur caused by the horizontal movement of a camera.

The super-resolution converter 132 performs image processing (hereinafter, "super-resolution conversion") on a low-resolution frame received from the preprocessor 131 to increase its resolution, thereby generating a frame having high-resolution moving image data in HD size (hereinafter, "high-resolution frame"). The super-resolution converter 132 then outputs the high-resolution frame to the post-processor 133.

The term "super-resolution conversion" as used herein refers to image sharpening, in which, from an image signal having low resolution, i.e., first resolution, an original pixel value is estimated to increase the pixels and thus to restore an image signal having high resolution, i.e., second resolution. The original pixel value refers to the value of each pixel of an image signal obtained by, for example, photographing the same object as that of an image having low resolution (first resolution) with a camera having high-resolution pixels and capable of capturing an image having high resolution (second resolution).

Besides, "original pixel value is estimated to increase pixels" means to obtain a correlation of an image, and estimate an original pixel value from neighboring images (in the same frame or between frames) using the correlation to increase pixels. The super-resolution conversion may be performed using known or commonly used technologies as disclosed in, for example, Japanese Patent Application Publication (KOKAI) Nos. 2007-310837, 2008-98803, and 2000-188680. In the embodiment, the super-resolution conversion uses a technology of, for example, restoring an image with frequency components above the Nyquist frequency determined by the sampling rate of the input image.

If employing the super-resolution conversion disclosed in Japanese Patent Application Publication (KOKAI) No. 2007-310837, the super-resolution converter 132 sets a target pixel in each of a plurality of frames of moderate resolution, and sets a target image area so that it contains the target pixel. The super-resolution converter 132 selects a plurality of correspondent points that correspond to a plurality of target image areas closest to a variation pattern of the pixel value in the target image area from the reference frame. The super-resolution converter 132 sets a sample value of luminance of the correspondent point to the pixel value of a corresponding target pixel. The super-resolution converter 132 calculates a pixel value for a high-resolution frame having more pixels than the reference frame and corresponding to the reference frame based on the size of a plurality of sample values and layout of the correspondent points. Thus, the super-resolution converter 132 estimates an original pixel value from a low-resolution image signal, and increases pixels to restore a high-resolution image signal.

If employing the super-resolution conversion using self-congruency position search in the same frame image disclosed in Japanese Patent Application Publication (KOKAI) No. 2008-98803, the super-resolution converter 132 calculates a first pixel position with the smallest error, i.e., a first error, by comparing errors of respective pixels in a search area of a frame of moderate resolution. The super-resolution converter 132 calculates a position with the smallest error in the search area with decimal precision based on the first pixel position and the first error, and a second pixel position around a first pixel and a second error thereof. The super-resolution converter 132 calculates a decimal-precision vector that has its end point at the position with the smallest error and its start point at a pixel of interest. The super-resolution converter 132 calculates an extrapolation vector of the decimal-precision vector that has its end point at a pixel on a screen which is not in the search area based on the decimal-precision vector. The super-resolution converter 132 calculates a pixel value for a high-resolution image having more pixels than an image signal based on a pixel value obtained from the image signal, the decimal-precision vector, and the extrapolation vector. In this manner, the super-resolution converter 132 estimates an original pixel value from a low-resolution image signal, and increases pixels to restore a high-resolution image signal.

The super-resolution converter 132 may employ the super-resolution conversion disclosed in Japanese Patent Application Publication (KOKAI) No. 2000-188680 using mapping between a plurality of frames.

The above technologies of the super-resolution conversion are cited by way of example and not by way of limitation. The super-resolution converter 132 may employ various other technologies as long as the original pixel value is estimated from a low-resolution image signal to increase pixels so as to restore a high-resolution image signal.

Having received the image signal on which the preprocessor 131 has performed noise reduction, etc., and having received the identification signal indicating the type of the source code, the super-resolution converter 132 obtains a super-resolution parameter corresponding to the type of the source code from the EEPROM 20 described later.

Figure 5:
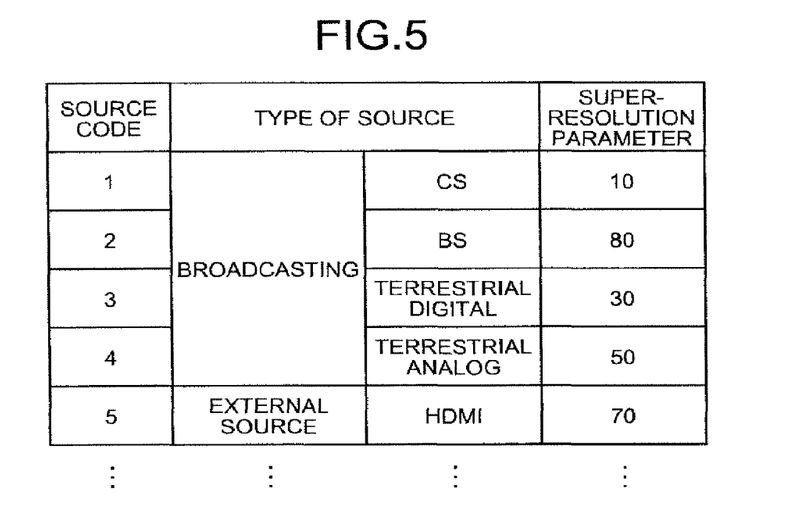
FIG. 5 is an exemplary diagram of relations between super resolution parameters and source codes stored in an EEPROM in the first embodiment.

FIG. 5 illustrates parameters stored in the EEPROM 20. As illustrated in FIG. 5, source codes, types of the source codes, and super-resolution parameters are stored in relation with each other.

The super-resolution parameter represents the intensity of the super-resolution conversion by numeric values. For example, large numeric value of the super-resolution parameter corresponds to a large number of high frequency components interpolated between pixels and/or high ratio of high-frequency component pixels with respect to pixels to be interpolated. Thus, the large numeric value of the super-resolution parameter indicates a higher sharpening gain and a higher intensity of the super-resolution conversion. The super-resolution parameters may be set appropriately in accordance with the various super-resolution processing. The super-resolution parameters illustrated in FIG. 5 represent, assuming that they are set to 100 when the super-resolution conversion is performed on all pixels, the ratio of high-frequency component pixels to be interpolated to all the pixels. In this manner, the index of the super-resolution conversion is stored as a parameter. Therefore, if there is a change in the reference of the super-resolution conversion, it is possible to easily and efficiently handle the change.

The super-resolution converter 132 performs the super-resolution conversion on an image signal based on the super-resolution parameter, and outputs it to the post-processor 133 described below.

In particular, for example, the super-resolution converter 132 obtains "10" as the super-resolution parameter when the type of the source code is "1" (i.e., CS broadcasting) as illustrated in FIG. 5. Then, the super-resolution converter 132 performs the aforementioned super-resolution processing based on the obtained parameter.

The super-resolution parameter of CS broadcasting is set to be smaller than that of BS broadcasting because an information amount of the CS broadcasting is less than that of the BS broadcasting. If strong super-resolution processing is performed on such CS broadcasting having less information amount, an image can be sharpened but increases noise also. Hence, sharp video cannot be effectively obtained as a result of the super-resolution processing. Further, a super-resolution parameter of video signals provided from externally connected device is set be smaller than that of the BS broadcasting because the video signals provided from the externally connected device has less noise with respect to the video signal provided via broadcasting communication. As mentioned above, the super-resolution parameter illustrated in FIG. 5 is set in accordance with the type of broadcasting, i.e., an information amount. The super-resolution parameter may be set to any value by a user.

In the following, the post-processor 133 is described. The post-processor 133 performs image correction (hereinafter, "post-processing") such as gamma correction and white balance adjustment on the image signal received from the super-resolution converter 132, and outputs it to the moving-image improving module 14.

Referring back to FIG. 1, the moving-image improving module 14 will be described. The moving-image improving module 14 performs double-speed processing on the image signal received from the post-processor 133. More specifically, the moving-image improving module 14 converts the frame rate of a video signal transmitted at 60 frames per second (fps) to 120 fps. This reduces image blur in a portion in which an object moves horizontally, vertically, and diagonally or rotates as well as efficiently suppressing noise. Thus, a telop sequence, a sports scene with fast motion, etc., can be displayed clearly. The moving-image improving module 14 outputs the image signal subjected to the frame rate conversion to the display processor 15.

The interpolation may be performed by generating an interpolation frame according to a commonly used method for interpolation of a frame image such as the interpolation frame generating method based on motion vector detection by block matching disclosed in Japanese Patent Application Publication (KOKAI) No. 2008-35404. In addition, the number of interpolation frames may be arbitrarily determined.

The display processor 15 has a driver and the like to output an image signal to the display 16 so that the display 16 can display the image signal received from the moving-image improving module 14.

The display 16 has a display panel such as a liquid crystal display (LCD) panel, a plasma panel, or a surface-conduction electron-emitter display (SED) panel. The display 16 displays an image signal on the screen under the control of the display processor 15.

The operation module 200 has a remote operation device such as a remote controller, and, in response to user pressing a channel selection button (not shown), sends the selection signal to the central processor 12.

Figure 6:
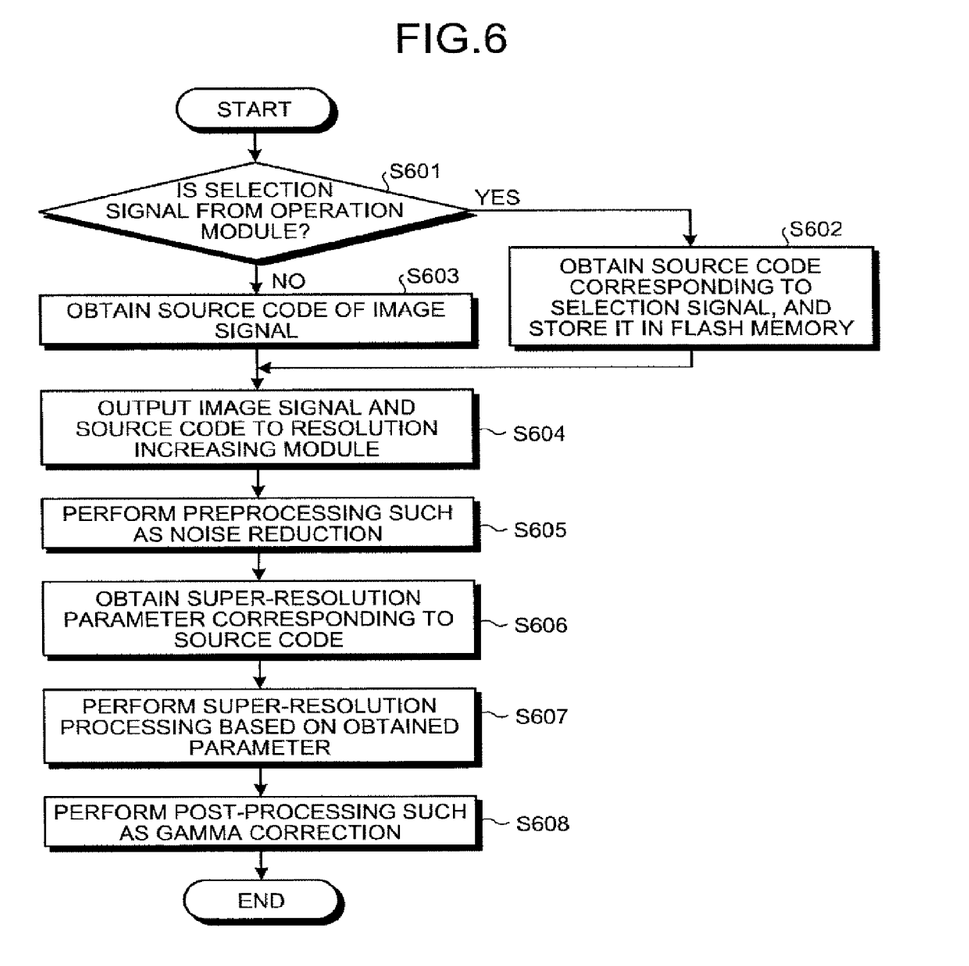
FIG. 6 is an exemplary flow chart of a super-resolution processing of the first embodiment performed based on types of source codes in the embodiment.

Described below is the operation of the aforementioned image display apparatus 100. FIG. 6 is a flow chart illustrating a process when the super-resolution conversion is performed based on types of broadcasting and the like, upon reception of the video signal.

As shown in FIG. 6, the source code determination module 122 of the central processor 12 determines whether the selection signal from the operation module 200 is received by the operation receiver 121 (S601).

When the source code determination module 122 determines that the selection signal from the operation module 200 is received by the operation receiver 121 (Yes at S602), the source code determination module 122 obtains the source code corresponding to the selection signal, and stores it in the flash memory 19 (S602).

On the other hand, when the source code determination module 122 determines that the selection signal is not received (No at S601), the source code determination module 122 obtains the source code contained in the image signal (S603).

Then, the source code determination module 122 sends the video signal to the resolution increasing module 13 with the source code obtained at S602 or S603 (S604).

When the preprocessor 131 of the resolution increasing module 13 receives the image signal from the source code determination module 122, the preprocessor 131 performs image processing such as interlace/progressive conversion and/or noise reduction, and outputs the image signal to the super-resolution converter 132 with the source code received from the central processor 12 (S605).

Upon receipt of the source code and the image signal from the preprocessor 131, the super-resolution converter 132 obtains the super-resolution parameter corresponding to the received source code from the EEPROM 20 (S606).

Then, the super-resolution converter 132 performs the super-resolution processing corresponding to the obtained super-resolution parameter on the image signal (S607). Subsequently, the super-resolution converter 132 outputs the image signal on which the super-resolution processing is performed to the post-processor 133. The post-processor 133 performs the correction such as the gamma correction on the image signal, and outputs it to the moving-image improving module 14 (S608). Accordingly, the image signal is displayed on the display 16 by the display processor 15.

As mentioned above, the source code determination module 122 of the central processor 12 determines the information amount of the video and decides the level of the super-resolution processing based on the determined type. Therefore, the super-resolution processing can be performed appropriately on the video.

In the embodiment, the super-resolution parameter is obtained based on the types of the broadcasting instructed by the user through the operation module 200, as the information amount of the video signals. However, the present embodiment is not limited thereto. The super-resolution parameter may be obtained based on, for example, genre information (for example, movie and sports) of a program selected from program information illustrated in FIG. 7. In this case, the program information containing the genre information is superimposed on the broadcasting signal from the key station, and transmitted.

In the aforementioned first embodiment, the type of broadcasting is explained as an example of the information amount of the externally received video signal. However, a noise amount contained in the broadcasting changes based on the type of the received broadcasting. Hence, if strong super-resolution conversion is performed on the video signal having a large noise amount, the noise amount might become noticeable. Hence, instead of the information amount such as the type of broadcasting, super-resolution conversion is performed based on the noise amount contained in the video signal.

Figure 8:
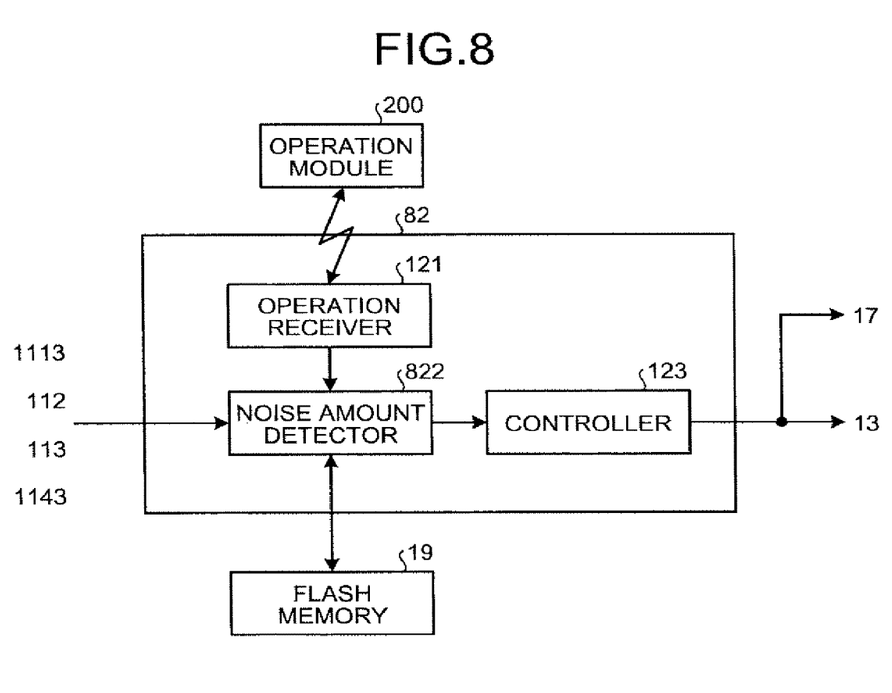
FIG. 8 is an exemplary schematic block diagram of a central processor according to a second embodiment of the invention.

FIG. 8 is an exemplary schematic block diagram illustrating a central processor 82 of the image display apparatus (not shown) of a second embodiment. The central processor 82 differs from the central processor 12 of the first embodiment in that the central processor 82 has a noise amount detector 822. In the following, identical symbols are assigned to elements identical to that of the first embodiment, and the explanation thereof is omitted.

Figure 9:
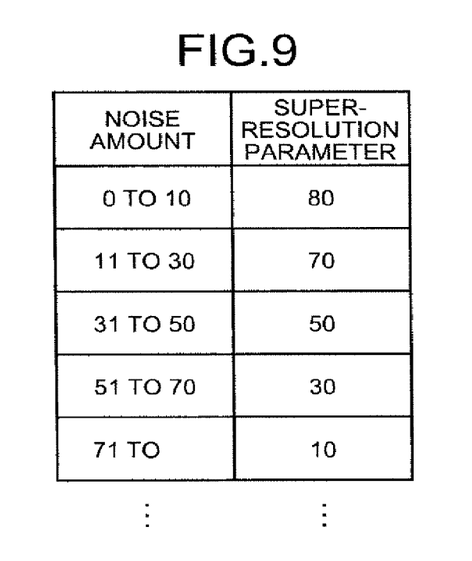
FIG. 9 is an exemplary diagram of a relations between noise amounts and super-resolution parameters in the second embodiment.

The noise amount detector 822 detects a noise amount contained in the video signal received from the digital signal demodulator 1113, the IPTV signal processor 112, the Internet signal processor 113, the external input module 114, and outputs it to the controller 123 described later with the video signal received from the video signal input module 11. Then, the noise amount detector 822 outputs the video signal and the noise amount through the controller 123. The super-resolution converter 132 obtains a super-resolution parameter stored in the EEPROM 20 in association with the noise amount as illustrated in FIG. 9, and performs a super-resolution processing based on the obtained super-resolution parameter. Subsequently, as similar to the first embodiment, various processing such as the post-processing and the moving-image improving are performed.

As shown in FIG. 9, the noise amount and the super-resolution parameter are associated with each other so that the super-resolution processing is to be performed strongly as the noise amount becomes smaller, and on the other hand, the super-resolution processing is to be performed weakly as the noise amount becomes large. This is because, when the noise amount is large, the noise becomes noticeable as a result of the sharpening of the image by the super-resolution conversion. Therefore, by storing the noise amount and the super-resolution parameter based on the aforementioned relationship, the super-resolution conversion can be performed appropriately in accordance with the noise amount.

Even when the video signal having large noise amount is received, the super-resolution conversion can be performed appropriately by detecting the noise amount of the video signal of which the noise amount is sufficiently removed by the noise reduction.

Figure 10:
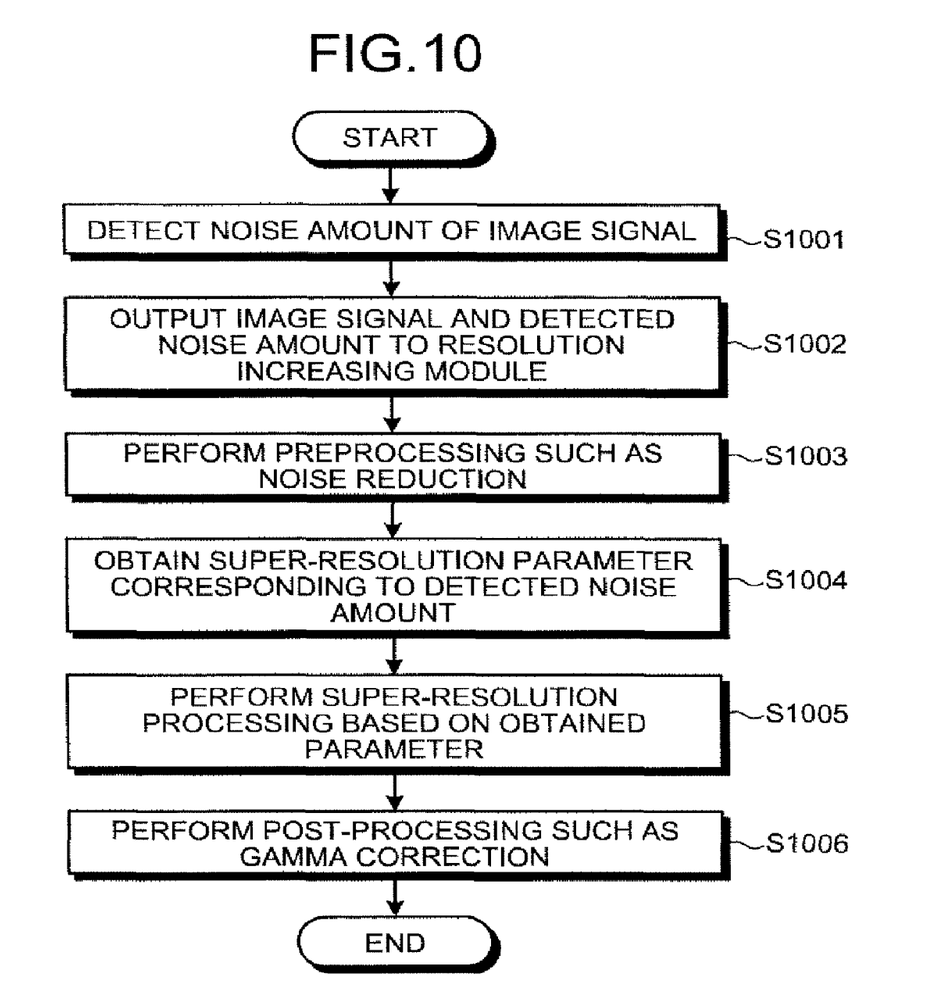
FIG. 10 is an exemplary flow chart of a super-resolution processing performed based on the noise amount in the second embodiment.

Processing performed by the image display apparatus of the second embodiment is explained with reference to FIG. 10. Explanations of the processing similar to that of the first embodiment are omitted.

The noise amount detector 822 detects the noise amount of the received image signal (S1001), and outputs the received image signal and the noise amount to the resolution increasing module 13 (S1002). It is already mentioned that the noise amount can be detected after the noise reduction.

Upon receipt of the image signal from the source code determination module 122, the preprocessor 131 of the resolution increasing module 13 performs an image processing such as the interlace/progressive conversion, and outputs the noise amount received from the central processor 12 and the image signal to the super-resolution converter 132 (S1003).

Upon receipt of the noise amount and the image signal from the preprocessor 131, the super-resolution converter 132 obtains the super-resolution parameter corresponding to the received noise amount from the EEPROM 20 (S1004).

Then, the super-resolution converter 132 performs the super-resolution processing corresponding to the obtained super-resolution parameter on the image signal (S1005). Subsequently, as similar to the first embodiment, the post-processing is performed (S1006). Accordingly, the image signal is displayed on the display 16 by the display processor 15.

As mentioned above, the noise amount detector 822 of the central processor 12 detects the noise amount of the video signal and decides the level of the super-resolution processing based on the detected noise amount. Accordingly, the super-resolution processing can appropriately be performed on the video.

For the source code determination module 122 and the noise amount detector 822, a terminal detector for detecting a type of external input terminal to which a video signal is input (such as D-terminal, HDMI terminal, and analog terminal) may be provided so as to change the degree of the super-resolution processing based on the detection result.

Further, for the source code determination module 122 and the noise amount detector 822, a resolution detector for detecting a resolution of an input video signal may be provided so as to change the degree of the super-resolution processing based on the detection result. In this case, the resolution information is to be contained in, for example, a broadcasting signal. As mentioned above, in the present embodiment, the degree of the super-resolution processing may be changed based on, without any limitation, the difference in input source such as the information amount, the noise amount, and the type of the terminal.

In the aforementioned embodiments, the image processor is applied to the image display apparatus 100 such as a digital TV having the display 16, the display processor 15, the audio output module 18, and the audio processor 17. However, the image processor may be applied to devices such as a tuner and set-top-box not having the display 16, the display processor 15, the audio output module 18, and the audio processor 17.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processor comprising:
an image converter configured to convert a first video signal of a first resolution to a second video signal of a second resolution higher than the first resolution using a parameter having a numeric value indicating a ratio of high-frequency component pixels of the first video signal to be interpolated and pixels forming the first video signal to be interpolated; and
a controller configured to change the parameter based on a type of broadcast wave of the first video signal, the type of broadcast wave including at least one of (i) satellite broadcasting and (ii) terrestrial broadcasting.

2. The image processor of claim 1, wherein the satellite broadcasting includes either (i) a broadcasting satellite (BS) broadcasting or (ii) a communication satellite (CS) broadcasting.

3. The image processor of claim 1, wherein the terrestrial broadcasting includes either (i) digital terrestrial broadcasting or (ii) analog terrestrial broadcasting.

4. The image processor of claim 1, further comprising:
an information amount receiver configured to receive an instruction for selecting a channel from a user, wherein the controller changes the parameter based on the type of broadcast wave of the selected channel.

5. The image processor of claim 1, further comprising:
a setting module configured to allow the user to set the parameter to any numeric value.

6. The image processor of claim 1, further comprising:
a detector configured to detect at least one of a bit rate amount of the first video signal, a noise amount of the first video signal, and a type of terminal to which the first video signal is input to detect a type of the broadcasting based on a detection result of the detector, wherein the controller changes the parameter based on the detected type of the broadcasting.

7. The image processor of claim 1, wherein the image converter is further configured to perform super-resolution processing by increasing the first resolution of the first video signal to the second resolution of the second video signal.

8. The image processor of claim 1, wherein the controller is further configured to change the parameter such that the smaller a transmission amount of a video signal of the type of broadcasting, the smaller the ratio.

9. The image processor of claim 1, further comprising:
a display configured to display the second image signal.

10. The image processor of claim 1, wherein the pixels forming the first video signal to be interpolated are all of the pixels of the first video signal to be interpolated.

11. An image processing method comprising:
converting a first video signal of a first resolution to a second video signal of a second resolution higher than the first resolution using a parameter having a numeric value indicating a ratio of high-frequency component pixels of the first video signal and pixels forming the first video signal; and
changing the parameter based on a type of broadcast wave of the first video signal, the type of broadcast wave including at least one of (i) satellite broadcasting and (ii) terrestrial broadcasting.

12. The image processing method of claim 11 further comprising: receiving the type of broadcast wave from a user, wherein the changing includes changing the parameter based on the received type of broadcast wave.

13. The image processing method of claim 11, wherein the satellite broadcasting includes either (i) a broadcasting satellite (BS) broadcasting or (ii) a communication satellite (CS) broadcasting.

14. The image processing method of claim 11, wherein the terrestrial broadcasting includes either (i) digital terrestrial broadcasting or (ii) analog terrestrial broadcasting.

15. An image processor comprising:
a resolution increase module configured to perform super-resolution processing by increasing a first resolution of a first video signal to a second resolution of a second video signal using a super-resolution level that indicates an intensity of a super-resolution conversion as a numeric value; and
a controller configured to change the super-resolution level based on a type of broadcasting of the first video signal, the type of broadcasting including at least one of (i) satellite broadcasting and (ii) terrestrial broadcasting.

16. The image processor of claim 15, wherein the satellite broadcasting includes either (i) a broadcasting satellite (BS) broadcasting or (ii) a communication satellite (CS) broadcasting.

17. The image processor of claim 15, wherein the terrestrial broadcasting includes either (i) digital terrestrial broadcasting or (ii) analog terrestrial broadcasting.

18. The image processor of claim 15, wherein
the super-resolution level indicates, in the super-resolution conversion, a ratio of high-frequency component pixels with respect to pixels to be interpolated.

19. The image processor of claim 18, wherein the pixels forming the first video signal to be interpolated are all of the pixels of the first video signal.

20. The image processor of claim 15, further comprising:
an information amount receiver configured to receive the type of broadcast wave from a user, wherein the controller is configured to change the super-resolution level to the super-resolution level corresponding to the received type of broadcast wave.

21. An image processor comprising:
a resolution increase module configured to perform super-resolution processing by increasing a first resolution of a first video signal to a second resolution of a second video signal using a parameter having a numeric value indicating a ratio of high-frequency component pixels of the first video signal to be interpolated and pixels forming the first video signal to be interpolated; and
a controller configured to change a super-resolution level indicating an intensity of the super-resolution processing performed by the resolution increase module based on a type of broadcast wave of the first video signal, the type of broadcast wave including at least one of (i) satellite broadcasting and (ii) terrestrial broadcasting.

22. The image processor of claim 21, wherein the satellite broadcasting includes either (i) a broadcasting satellite (BS) broadcasting or (ii) a communication satellite (CS) broadcasting.

23. The image processor of claim 21, wherein the terrestrial broadcasting includes either (i) digital terrestrial broadcasting or (ii) analog terrestrial broadcasting.

* * * * *